United States Patent
Tamagawa et al.

[11] Patent Number: 6,034,497
[45] Date of Patent: Mar. 7, 2000

[54] APPARATUS FOR DETECTING PINCHING OF AN OBJECT IN A POWER WINDOW

[75] Inventors: Kenichi Tamagawa; Yukio Miura, both of Miyagi-ken, Japan

[73] Assignee: Alps Electric Co., Ltd., Tokyo, Japan

[21] Appl. No.: 09/274,216

[22] Filed: Mar. 23, 1999

[30]    Foreign Application Priority Data

Mar. 23, 1998   [JP]   Japan .................................. 10-074045

[51] Int. Cl.⁷ ....................................................... B60J 1/16
[52] U.S. Cl. ........................ 318/466; 318/468; 318/266; 318/268; 318/282
[58] Field of Search .................................... 318/260–289, 318/460–470, 455, 447; 361/31, 29; 160/291, 292, 293.1; 49/28, 349; 364/424.05

[56]        References Cited

U.S. PATENT DOCUMENTS

| | | | |
|---|---|---|---|
| 4,581,711 | 4/1986 | Hirata et al. . | |
| 5,399,950 | 3/1995 | Lu et al. ................................. | 318/565 |
| 5,422,551 | 6/1995 | Takeda et al. ......................... | 318/265 |
| 5,436,539 | 7/1995 | Wrenbeck et al. .................... | 318/265 |
| 5,530,329 | 6/1996 | Shigematsu et al. .................. | 318/469 |
| 5,689,160 | 11/1997 | Shigematsu et al. ................. | 318/281 |
| 5,714,853 | 2/1998 | Knab et al. ............................ | 318/265 |
| 5,774,046 | 6/1998 | Ishihara et al. ........................ | 318/257 |
| 5,801,501 | 9/1998 | Redelberger .......................... | 318/283 |
| 5,832,664 | 11/1998 | Tajima et al. ......................... | 49/26 |
| 5,872,436 | 2/1999 | Bergmann et al. ..................... | 318/286 |
| 5,917,296 | 6/1999 | Frey et al. .............................. | 318/268 |
| 5,945,796 | 8/1999 | Ohmori et al. ......................... | 318/266 |

*Primary Examiner*—Paul Ip
*Attorney, Agent, or Firm*—Brinks Hofer Gilson & Lione

[57]              ABSTRACT

A method of detecting the pinching of an object of a power window for obtaining an accurate motor torque value dealing with a fluctuation in the ambient temperature and reducing an error at the time of detecting the pinching of an object without using a temperature sensor is disclosed. The apparatus comprises a window opening/closing motor 4, a motor driving unit 3, a pulse generating unit 5, an MCU 2, and an operation switch 1. A base value, a tolerance value and a reference value as an addition value of the base value and the tolerance value are set for each of a plurality of regions obtained by dividing the whole window travel range. The MCU 2 detects a motor torque at the time of opening and closing the window and compares the motor torque with the reference value preset for the travel region. When the motor torque exceeds the reference value, the MCU 2 determines the presence of the pinching of an object and stops or reverses the driving of the motor 4. The MCU 2 calculates a correction factor from the motor torque and the base value every travel region and uses a corrected reference value obtained by multiplying the reference value of the next travel region by the correction factor when the motor torque is compared with the reference value in the next travel region.

3 Claims, 8 Drawing Sheets

APPARATUS FOR DETECTING PINCHING OF AN OBJECT IN A POWER WINDOW

BACKGROUND OF THE INVENTION

1. Field of the Invention

The present invention relates to an apparatus for detecting pinching of an object of a power window apparatus and, more particularly, to an apparatus for detecting the pinching of an object of a power window for detecting the pinching of an object in accordance with a change in ambient temperature of the power window without using a temperature sensor.

2. Description of the Related Art

Hitherto, in order to prevent an object from being pinched in a window and damaged at the time of window closing operation and prevent an excessive load from being applied to a motor used for opening and closing the windows, a power window apparatus for opening and closing the windows of a vehicle senses the pinching of an object and either stops or reverses the motor when the pinching of an object is sensed, thereby avoiding damaging the object and preventing application of an excessive load to the motor.

A known power window apparatus which senses the pinching of an object comprises at least a motor for opening and closing windows, a motor driving unit for driving the motor, a pulse generator for generating a pulse, a microcomputer control unit (MCU), and an operation switch for opening and closing the windows by manual operation. The pulse generator is coupled to the motor. The microcomputer control unit is connected to the pulse generator, the operation switch, and the motor driving unit. The motor driving unit is connected to the motor.

In the power window apparatus which senses the pinching of an object and has the above construction, when any of switches in the operation switch is operated, a drive signal from the microcomputer control unit is supplied to the motor via the motor driving unit to rotate the motor and allow a window to be opened or closed in accordance with the operated switch. When the motor rotates, the pulse generator coupled to the motor operates and generates a two-phase pulse. The microcomputer control unit acquires a pulse edge interval of the two-phase pulse generated from the pulse generator by counting clock signals and compares the acquired count value as a motor torque value with a base value which is preliminarily set in an internal memory. When the motor torque value is considerably larger than the base value, occurrence of the pinching of an object in the window is determined and the motor is immediately stopped or reversed.

The known power window apparatus which senses the pinching of an object is usually disposed on the inner side of a door panel in a vehicle. A motor torque for opening and closing the window fluctuates according to the ambient temperature when the vehicle is used, that is, the temperature on the inside of the door panel.

Figure 8:
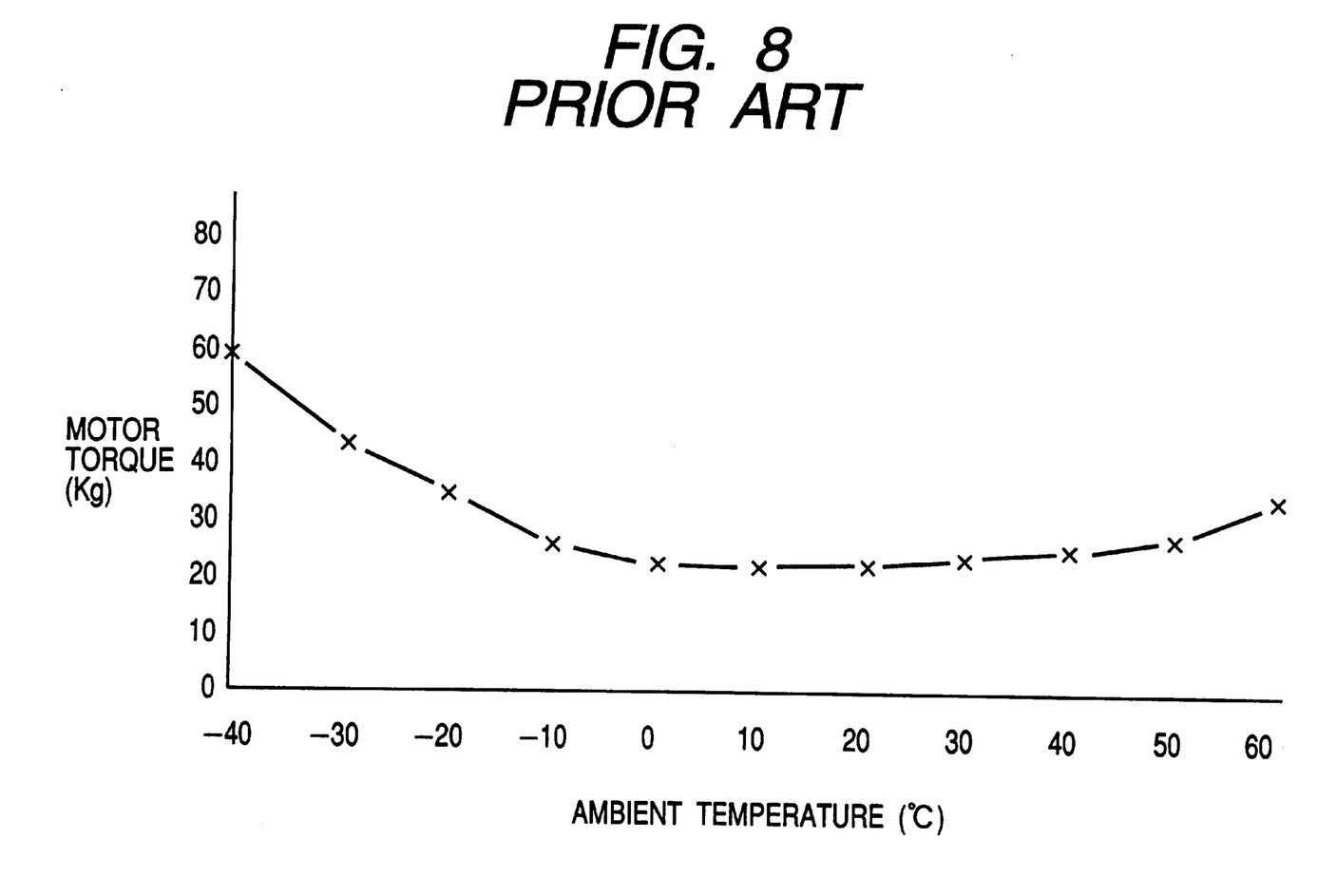
FIG. 8 is a characteristic diagram showing an example of a state of fluctuation in the motor torque associated with the fluctuation in the ambient temperature in the motor for opening and closing windows.

FIG. 8 is a characteristic diagram showing an example of the state of fluctuation in the motor torque associated with fluctuation in the ambient temperature of the motor for opening/closing windows.

As shown in FIG. 8, when the ambient temperature is room temperature, for example, within a range from −10° C. to 40° C., fluctuation in the motor torque is small. When the ambient temperature becomes −10° C. or lower, especially about −40° C. or becomes 40° C. or higher, especially about 80° C., the fluctuation in the motor torque becomes considerably large. When the pinching of an object in the window is sensed by using the motor torque at the ambient temperature, a larger error occurs compared to sensing the pinching of an object in the window at room temperature.

In the known power window apparatus which performs a pinching detecting operation, therefore, a correction factor indicative of the relation between the ambient temperature and the motor torque is preliminarily obtained and stored in the internal memory. When the ambient temperature is sensed by the temperature sensor disposed on the inside of the door panel, the correction factor corresponding to the detected ambient temperature is determined from the internal memory. The motor torque value is corrected by using the correction factor, and the pinching of an object in the window is sensed by using the corrected motor torque value.

Since the known power window apparatus which performs the temperature correction senses the pinching of an object in the window according to the ambient temperature of a vehicle which is being used, the apparatus is effective when the ambient temperature fluctuates. The relation between the fluctuation in the ambient temperature and that in the motor torque value is not always a proportional relation. Moreover, the motor torque characteristics of the motor for opening and closing windows largely vary among motors. Even if the motor torque value is corrected in correspondence with the fluctuation in the ambient temperature, an accurate motor torque value dealing with the fluctuation in the ambient temperature cannot be obtained. The error still occurs at the time of sensing the pinching of an object in the window.

The the known power window apparatus in which the temperature correction is performed has a problem in that the ambient temperature sensed by a temperature sensor varies according to the position in which the temperature sensor is disposed. Thus, an accurate motor torque value dealing with the fluctuation in the ambient temperature cannot be obtained and an error occurs at the time of sensing the pinching of an object in the window.

SUMMARY OF THE INVENTION

The object of the invention is to provide an apparatus for sensing the pinching of an object of a power window, which reduces the error associated with a fluctuation in the ambient temperature at the time of sensing the pinching of an object in the window without using the temperature sensor.

In order to achieve the object of the invention there is provided an apparatus for sensing the pinching of an object of a power window comprising: a window opening/closing motor; a motor driving unit; a pulse generator for generating a pulse corresponding to the rotation of the motor; a microcomputer control unit; and an operation switch, wherein the microcomputer control unit has a means for setting a correction reference value obtained by multiplying a reference value of the next travel region by a correction factor as a ratio between a motor torque value sensed in a window travel region and a base value set for the travel region and using the correction reference value when the motor torque value detected in the next travel region is compared with the reference value.

According to the means, the correction factor is obtained by calculating the ratio between the motor torque value detected in a window travel region and the base value set for the window travel region. When the window moves to the next window travel region, the pinching of an object in the window is detected by using the correction reference value corrected by the correction factor. Consequently, the correction reference value including the fluctuation in the motor torque value corresponding to the fluctuation in the ambient temperature of the vehicle which is being used can be obtained without using a temperature sensor, so that any error associated with the fluctuation in the ambient temperature in case of detecting the pinching of an object in the window can be reduced.

According to an embodiment of the invention, there is provided an apparatus for detecting the pinching of an object of a power window comprising: a motor for opening and closing a window via a window driving mechanism; a motor driving unit for driving the motor; a pulse generating unit for generating a pulse corresponding to the rotation of the motor; a microcomputer control unit for performing a whole control driving process; and an operation switch for opening and closing the window by manual operation. The whole travel range of the window is equally divided into a plurality of travel regions. A base value, a tolerance value, and a reference value, which is a value obtained by adding the base value and the tolerance value, are set for each of the plurality of travel regions. The microcomputer control unit sequentially detects motor torque values used when the window is opened and closed, compares the detected motor torque value with the reference value which is preset for the travel region, determines that an object is pinched in the window when the motor torque value exceeds the reference value, and stops or rotates the motor in reverse. The microcomputer control unit calculates a correction factor as a ratio between the motor torque value detected in a travel region and the base value set for the travel region and uses a correction reference value obtained by multiplying the reference value by the correction factor in place of the reference value set for the next travel region when the presence or absence of the pinching of an object is determined in the next travel region.

According to a specific example of a mode for carrying out the invention, there is provided an apparatus for detecting the pinching of an object of a power window, wherein the correction reference value is set only when the ratio between the motor torque value detected in each window travel region and a base value set for the window travel region is out of a predetermined range. In this case, preferably, the predetermined range of the ratio between the motor torque value and the base value is ±15%.

According to the embodiments of the invention as mentioned above, the fluctuation in the motor torque value corresponding to the fluctuation in the ambient temperature of the vehicle which is being used is included in the correction factor without using a temperature sensor and the correction reference value obtained by correcting the reference value by the correction factor including the fluctuation in the motor torque value is set. After that, when the window travels in a window travel region, by comparing the motor torque value detected in the window travel region with the correction reference value set for the immediately preceding window travel region, an accurate motor torque value dealing with the fluctuation in the ambient temperature at the time point when the window travels in each window travel region can be obtained. Thus, an apparatus for detecting the pinching of an object of a power window which can reduce an error at the time of detecting the pinching of an object in a window can be achieved.

DETAILED DESCRIPTION OF THE PREFERRED EMBODIMENTS

Embodiments of the invention will be described hereinbelow with reference to the drawings.

Figure 1:
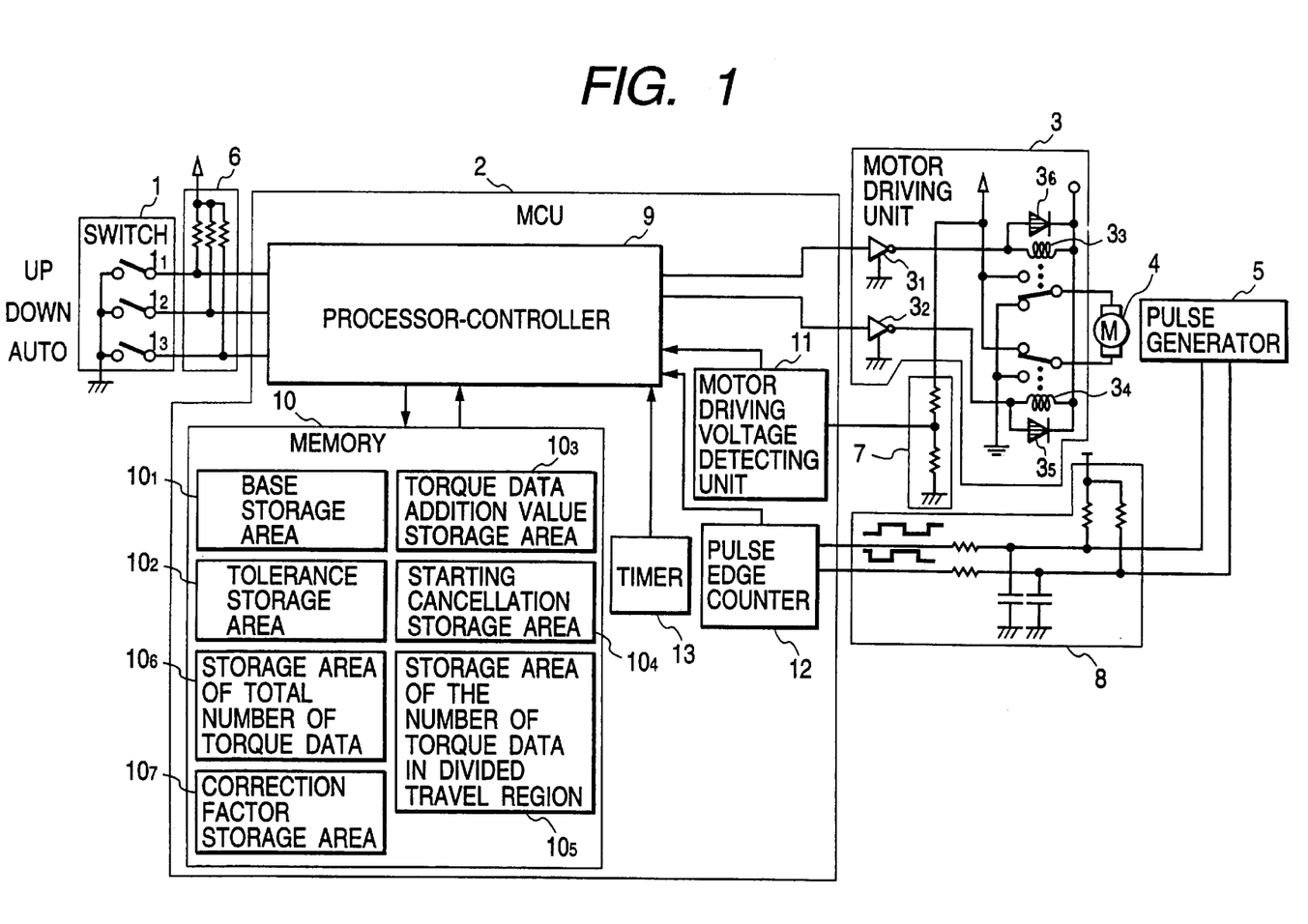
FIG. 1 is a block diagram showing the construction of a power window apparatus to which an embodiment of an apparatus for sensing the pinching of an object in the power window according to the invention is applied.

FIG. 1 is a block diagram showing the construction of a power window apparatus to which an embodiment of the aparatus for sensing the pinching of an object in the power window apparatus according to the invention is applied.

As shown in FIG. 1, the power window comprises a switching arrangement 1, a microcomputer control unit (MCU) 2, a motor driving unit 3, a motor 4, a pulse generator 5, a pull-up resistor 6, a voltage dividing resistor 7, and a pulse transmission path 8.

Figure 2A:
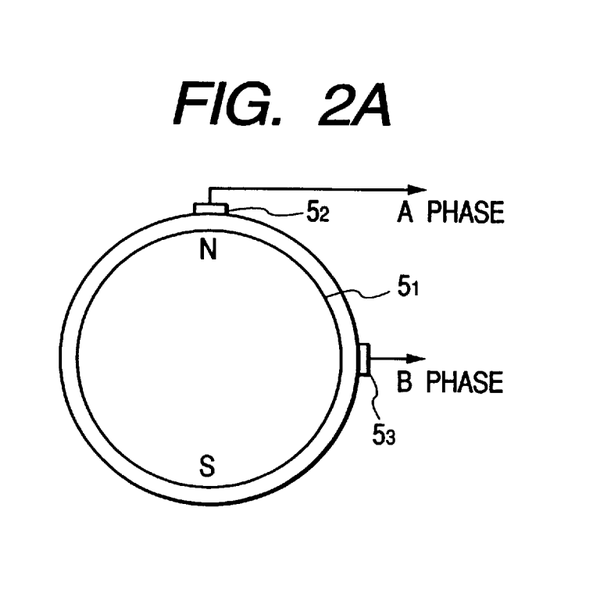
FIG. 2A is a diagram showing the pulse generation principle of a pulse generator used in the power window apparatus shown in FIG. 1.
Figure 2B:
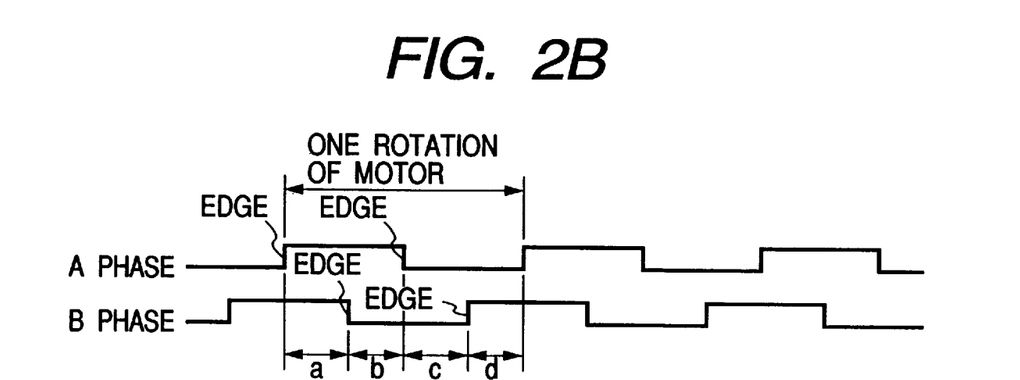
FIG. 2B is a waveform chart showing a two-phase rectangular pulse generated from the pulse generator.

FIG. 2A is a diagram showing the pulse generating principle structure of the pulse generator 5 for use in the power window apparatus shown in FIG. 1. FIG. 2B is a waveform chart showing a two-phase rectangular pulse generated from the pulse generator 5 at the time of driving the motor 4.

As shown in FIG. 2A, the pulse generator 5 has a rotator $5_1$ and Hall elements $5_2$ and $5_3$.

The switching arrangement 1 has a window raising switch $1_1$, a window lowering switch $1_2$, and an automatic switch $1_3$ which are individually operated. The window raising switch $1_1$ instructs a window raising (closing) operation. The window lowering switch $1_2$ instructs a window lowering (opening) operation. The window travels in a designated direction only when either the switch $1_1$ or $1_2$ is operated. When the operation of the switch $1_1$ or $1_2$ is stopped, the travel of the window is also stopped. The automatic switch $1_3$ instructs an automatic continuation of the operation.

When the automatic switch $1_3$ and the window raising switch $1_1$ are simultaneously operated, the window starts the raising (closing) operation. Even if the operation of the automatic switch $1_3$ and the window raising switch $1_1$ is stopped after that, the window raising (closing) operation continues and is stopped when the window reaches the uppermost part of the window frame. When the automatic switch $1_3$ and the window lowering switch $1_2$ are simultaneously operated, the window similarly starts the lowering (opening) operation. Even if the operation of the automatic switch f$1_3$ and the window lowering switch $1_2$ is stopped, the window lowering (opening) operation continues and is stopped when the window reaches the lowermost part of the window frame.

The microcomputer control unit 2 comprises a processor-controller 9, a memory 10, a motor driving voltage detecting unit 11, a pulse edge counter 12, and a timer 13. Among the elements, the processor-controller 9 controls the rotating state of the motor 4 via the motor driving unit 3 by generating a control signal corresponding to the operating state of the switching arrangement 1, supplying the control signal to the motor 4 via the motor driving unit 3 to rotate the motor 4, and executing a predetermined data process, a data arithmetic operation, and the like on the basis of data supplied from the motor driving voltage detecting unit 11 and the pulse edge counter 12 and data stored in the memory 10. The memory 10 has seven storage areas of a base value storage area $10_1$, a tolerance value storage area $10_2$, a torque data addition value storage area $10_3$, a starting cancellation storage area $10_4$, a storage area $10_5$ of the number of torque data in a divided travel region, a storage area $10_6$ of the total number of torque data, and a correction factor storage area $10_7$. The contents of the storage to the seven storage areas $10_1$ to $10_7$ will be described hereinbelow. The motor driving voltage detecting unit 11 detects a divided voltage indicative of the voltage of a vehicle-mounted power supply (battery) obtained at a voltage dividing point of the voltage dividing resistor 7. The pulse edge counter 12 detects pulse edges of a two-phase pulse supplied from the pulse generator 5.

The motor driving unit 3 has two inverters $3_1$ and $3_2$ for inverting a control signal, two relays $3_3$ and $3_4$ for switching the rotation of the motor to forward rotation, reverse rotation, or stoping the rotation, and two diodes $3_5$ and $3_6$ for preventing occurrence of a spark. The motor driving unit 3 rotates the motor 4 in accordance with the state of the control signal supplied from the microcomputer control unit 2.

The rotation shaft of the motor 4 is connected to the windows of the vehicle via a window driving mechanism (not shown). For example, the motor 4 closes the window at the time of the forward rotation and opens it at the time of reverse rotation.

The pulse generator 5 is directly attached to the motor 4. As shown in FIG. 2A, it is attached to the rotation shaft of the motor 4. The pulse generator 5 has the rotator $5_1$ on which south and north poles are polarized so as to face each other in the circumferential part and the Hall elements $5_2$ and $5_3$ arranged near the circumferential part of the rotator $5_1$ to generate two-phase pulses having a phase difference of 90° when the motor 4 rotates. When the motor 4 rotates, the rotator $5_1$ simultaneously rotates by the rotation of the motor 4. As shown in FIG. 2B, the two Hall elements $5_2$ and $5_3$ detect the polarized parts of the rotator $5_1$ and generate two-phase pulses having a deviation of a ¼ cycle. One cycle of the pulse is obtained when the motor 4 rotates once.

The pull-up resistor 6 has three resistors connected in parallel connected to the outputs of the switching arrangement 1, the inputs of the microcomputer control unit 2, and the power supply. The pull-up resistor 6 supplies a power voltage (for example, 8V) to the inputs of the microcomputer control unit 2 when the three switches $1_1$, $1_2$, and $1_3$ are not operative.

The voltage dividing resistor 7 comprises two resistors which are serially connected between the vehicle-mounted power supply (battery) and the ground and the connection point of the two resistors is connected to the motor driving voltage detecting unit 11 in the microcomputer control unit 2.

The pulse transmission path 8 comprises two pull-up resistors connected between the outputs of the pulse generator 5 and the power supply, capacitors connected between the outputs of the pulse generator 5 and the ground, and two serial resistors connected between the outputs of the pulse generator 5 and the inputs of the pulse edge counter 12. Through the pulse transmission path 8, the two-phase pulse generated from the pulse generator 5 is transmitted to the pulse edge counter 12.

When the motor 4 rotates to open or close the windows, the two-phase pulse generated by the pulse generator 5 is supplied via the pulse transmission path 8 to the microcomputer control unit 2. The pulse edge counter 12 detects the pulse edges (leading and trailing edges) of the two-phase pulse and supplies an edge detection signal to the processor-controller 9 each time the pulse edge is detected. The processor-controller 9 counts the supply timing of the edge detection signal by the timer 13 to measure an arrival time interval (hereinbelow, referred to as edge interval data) between an edge detection signal and the subsequent edge detection signal. The edge interval data is obtained every ¼ rotation of the motor 4.

In the power window apparatus shown in FIG. 1, in order to detect the presence of the pinching of an object in the window, motor torque values when the window is opened and closed are used as detection parameter values. The motor torque values are calculated from the pulse edge interval data. The motor torque value includes the weight of the window, a frictional force between the window and the sash, and the like. In the power window apparatus shown in FIG. 1, a plurality of travel regions obtained by dividing the whole travel region of the window are set (effective travel region between the full-open position and the full-close position) on the basis of the count value derived by counting the number each time the pulse edge interval data arrives. A base value and a tolerance value of the motor torque are preset for each travel region.

Figure 3:
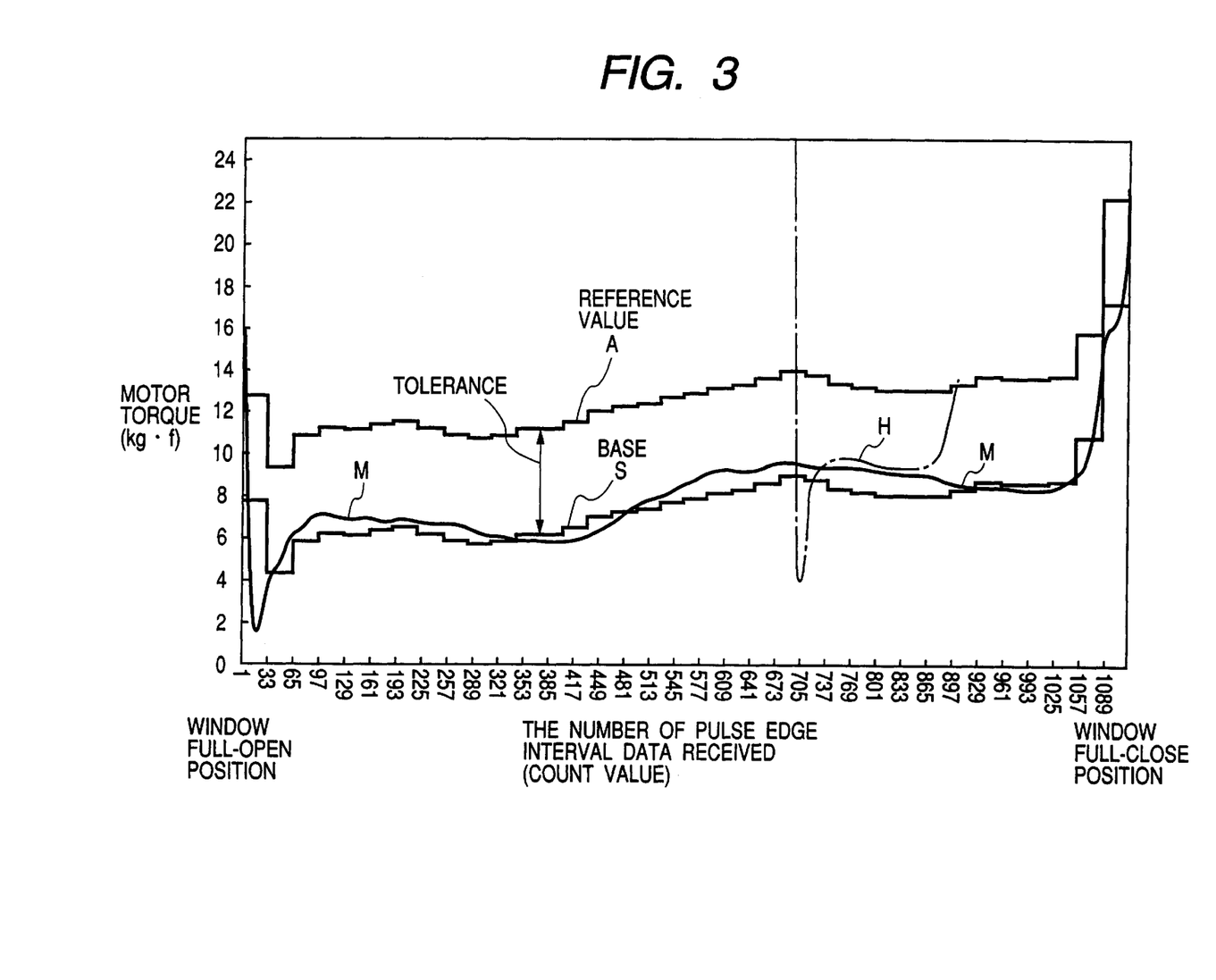
FIG. 3 is a characteristic diagram showing an example of an addition value and a base value of the motor torque set for each travel region when the whole travel region of a window is divided into 36 travel regions in the power window apparatus shown in FIG. 1.

FIG. 3 is a characteristic diagram showing an example of the base value and a reference value (base value+tolerance value) of the motor torque value which are set for each travel region when the whole travel region of the window is divided into 36 travel regions in the power window apparatus shown in FIG. 1.

In FIG. 3, the vertical axis shows the motor torque and the horizontal axis shows the count number obtained by counting the number each time the pulse edge interval data arrives. The lower stair-like characteristic (S) shows the base value of the motor torque. The upper stair-like characteristic (A) indicates the reference value (base value+tolerance value) of the motor torque. The solid line (M) is a curve of the motor torque when nothing is pinched in the window. The alternate long and short dash line (H) is a curve of the motor torque when an object is pinched in the window.

The base value of the motor torque shown in FIG. 3 is the motor torque value necessary to move the window when there is no substantial pinching of an object in the window as determined by the motor torque value measured when there is no pinching of an object. The base value is updated to a new value each time the window travels, that is, "learned".

In this case, the motor torque is calculated from the pulse edge interval data and the motor driving voltage as will be described hereinlater. The pulse edge interval data is obtained each time the motor 4 rotates ¼. When the window travels the effective travel region from the full-open position to the full-close position, that is the 36 travel regions, since 32 pulse edge interval data are obtained from each travel region, about 1200 pulse edge interval data are obtained in total. Data of the motor torque of the same number are therefore obtained. The base value is obtained as an average of the 32 motor torque values.

The tolerance value in the addition value shown in FIG. 3 is usually a constant value irrespective of the position in the travel regions and generally determined according to a standard or the like. A value obtained by converting the maximum permissible force which can be applied to an object pinched in the window into a motor torque or a value obtained by performing some correction to the above obtained value is used as the tolerance value. The reference value is obtained by adding the tolerance value to the base value. The pinching of an object is determined by comparing the value with the present motor torque value.

In the power window apparatus shown in FIG. 1, operation as shown below is executed.

When one of the switches in the switching arrangement 1, for example, the window raising switch $1_1$ is operated, the input of the microcomputer control unit 2 connected to the window raising switch $1_1$ is changed from the potential of 8V to the ground potential. At this moment, the processor-controller 9 in the microcomputer control unit 2 supplies a control signal to rotate the motor forward 4 to the motor control unit 3 in response to the supplied ground potential. The motor control unit 3 switches the two relays $3_3$ and $3_4$ in response to the control signal and rotates the motor 4 forward. When the motor 4 rotates forward, the window is moved in the closing direction by the window driving mechanism connected to the motor 4. By the rotation of the motor 4, the pulse generator 5 attached to the motor 4 generates the two-phase pulse and the generated two-phase pulse is supplied via the pulse transmission path 8 to the pulse edge counter 12 in the microcomputer control unit 2.

When the operation of the window raising switch $1_1$ is stopped, the input of the microcomputer control unit 2 connected to the window raising switch $1_1$ is changed from the ground potential to the 8V potential. At this moment, the processor-controller 8 supplies the control signal to stop the rotation of the motor 4 to the motor control unit 3 in response to the supplied 8V potential. The motor control unit 3 switches the two relays $3_3$ and $3_4$ in response to the control signal to stop the supply of the power to the motor 4, thereby stopping the rotation of the motor 4. When the rotation of the motor 4 is stopped, the operation of the window driving mechanism connected to the motor 4 is stopped and the window is stopped at the present position. When the rotation of the motor 4 is stopped, the pulse generator 5 attached to the motor 4 stops the generation of the two-phase pulse, so that the two-phase pulse is not supplied to the pulse edge counter 12.

When another switch in the switching arrangement 1, for example, the window lowering switch $1_2$ is operated, in a manner similar to the foregoing case, the input of the microcomputer control unit 2 connected to the window lowering switch $1_2$ is changed to the ground potential. At this moment, the processor-controller 9 in the microcomputer control unit 2 supplies a control signal to rotate the motor 4 in reverse to the motor control unit 3 in response to the inputted ground potential. The motor control unit 3 switches the two relays $3_3$ and $3_4$ in response to the control signal to reversely rotate the motor 4. When the motor 4 rotates in reverse, the window is opened by the driving mechanism connected to the motor 4. In this case as well, when the motor 4 rotates, the pulse generator 5 attached to the motor 4 generates the two-phase pulse, and the generated two-phase pulse is supplied via the pulse transmission path 8 to the pulse edge counter 12.

After that, when the operation of the window lowering switch $1_2$ is stopped, the input of the microcomputer control unit 2 connected to the window lowering switch $1_2$ is changed from the ground potential to the 8V potential. At this moment, the processor-controller 9 supplies a control signal to stop the rotation of the motor 4 to the motor control unit 3 in response to the inputted 8V potential. The motor control unit 3 switches the two relays $3_3$ and $3_4$ in response to the control signal to stop the supply of the power to the motor 4, thereby stopping the rotation of the motor 4. When the rotation of the motor 4 is stopped, the operation of the window driving mechanism connected to the motor 4 is stopped and the window stops travelling at the present position. When the rotation of the motor 4 is stopped, the pulse generator 5 attached to the motor 4 also stops the generation of the two-phase pulse, so that no two-phase pulse is supplied to the pulse edge counter 12.

With respect to the operation when the window raising switch $1_1$ and the automatic switch $1_3$ are simultaneously operated and the operation when the window lowering switch $1_2$ and the automatic switch $1_3$ are simultaneously operated, operation almost like the above-described operation or operation according to each of the above-mentioned operations is performed.

Figure 4:
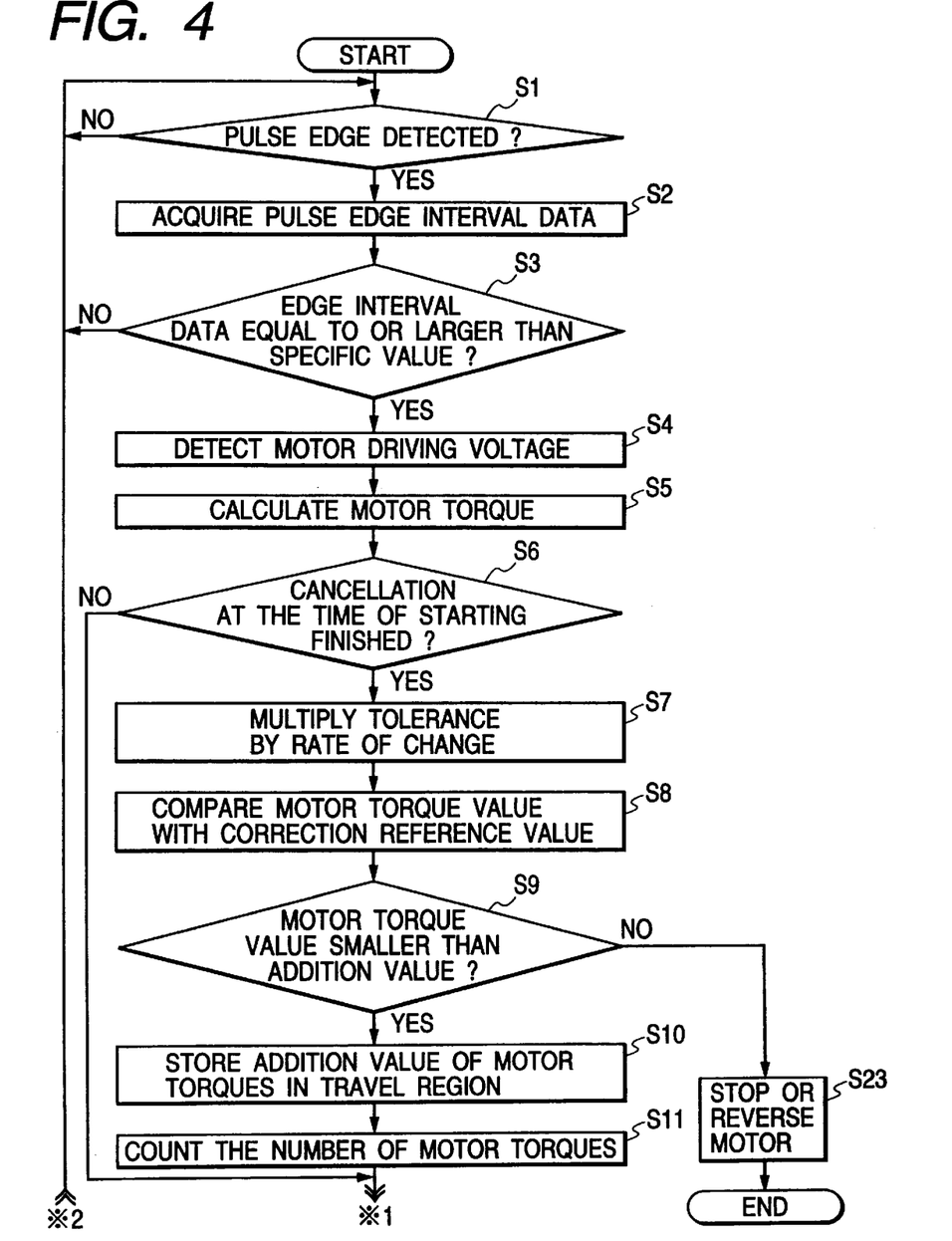
FIG. 4 is a part of a flowchart showing the flow of a detailed operation including detection of the pinching of an object in a window at the operating time of the power window apparatus shown in FIG. 1.
Figure 5:
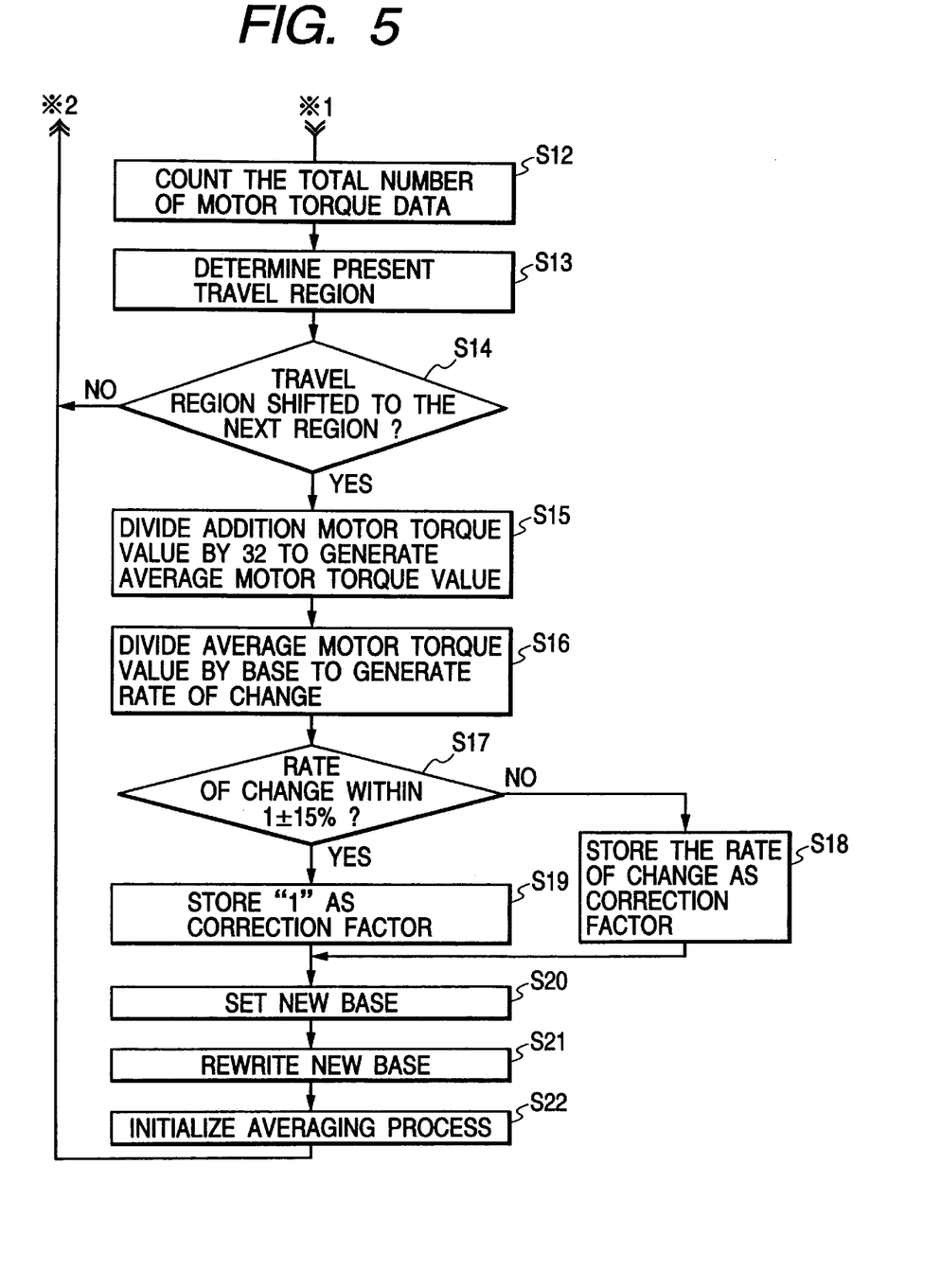
FIG. 5 is the remaining part of the flowchart showing the flow of the detailed operation including the detection of pinching of an object in the window at the operating time of the power window apparatus shown in FIG. 1.

FIGS. 4 and 5 are flowcharts showing the process of the detailed operation including detection of the pinching of an object in the window at the time of operation as described above in the power window apparatus shown in FIG. 1.

The process of the detailed operation of the power window apparatus shown in FIG. 1 will be described as follows with reference to the flowcharts shown in FIGS. 4 and 5.

In step S1, the processor-controller 9 in the microcomputer control unit 2 determines whether pulse edges of the two-phase pulse supplied from the pulse generator 5 are detected or not by the pulse edge counter 12. When it is determined that the pulse edge is detected (YES, hereinbelow, referred to as "Y") , the routine advances to step S2. On the other hand, when it is determined that the pulse edge has not been detected yet (NO, hereinbelow, referred to as "N"), step S1 is repeatedly executed.

In step S2, when the pulse edge counter 12 detects the pulse edges, the processor-controller 9 acquires pulse edge interval data indicative of a time interval between the time point when the pulse edge is detected previously and that when the pulse edge is detected this time by the count of the timer 13.

In step S3, the processor-controller 9 determines whether or not the acquired pulse edge interval data is equal to or longer than a specified time (for example, 3.5 msec), that is, whether it is normal pulse edge interval data or noise. When it is determined that the pulse edge interval data is equal to or longer than the specified time (Y), the routine advances to the next step S4. When it is determined that the pulse edge interval data is shorter than the specified time, namely, noise (N), the routine is returned to the first step S1 and the operations of S1 and subsequent steps are repeatedly executed.

In step S4, the processor-controller 9 obtains the divided voltage detected by the voltage dividing resistor 7 in the motor driving voltage detecting unit 11 as a motor driving voltage E.

In step S5, the processor-controller 9 executes an arithmetic operation by using the obtained motor driving voltage E and pulse edge interval data Pw to thereby calculate a motor torque Tc. In this case, the motor torque Tc is calculated based on the following equation (1).
[Equation 1]

$$Tc = \left\{\left(kt \cdot \frac{E}{Rm}\right) - Tm\right\} - \frac{ke \cdot kt}{Rm \cdot Pw} \quad (1)$$

where, Tc: motor load torque

E: motor driving voltage kt: motor torque coefficient

Rm: motor wire wound resistance

Ke: motor generation coefficient

Pw: edge interval data

Tm: motor internal torque

In step S6, the processor-controller 9 determines whether the operation upon starting of the motor 4 has been terminated or not, that is, whether cancellation upon starting has been terminated or not. When it is determined that the operation upon starting has been terminated (Y), the routine advances to the next step S7. On the other hand, when it is determined that the operation upon starting has not been terminated yet (N), the routine advances to step S12.

Whether or not the operation upon starting of the motor 4 is terminated is determined for the following reason. Since the internal torque of the motor 4 is at a stage where the internal torque of the motor 4 changes from the maximum state to the stationary state when the motor 4 is started, if the detection of the pinching of an object is performed on the basis of the motor torque value measured at the stage, the pinching of an object in the window is erroneously determined by a large motor load torque value measured. When the large motor torgue value is used to update the base value, there is a case such that a new base value is set to an erroneous value which does not match the current state.

In this case, whether the operation upon starting the motor 4 has been terminated or not is determined based on a period of time from the detection of the first pulse edge until a predetermined number of pulse edges are detected.

In the case where the operation upon starting the motor 4 has not been terminated, the fact is stored in the starting cancellation storage area $10_4$ in the memory 10.

In step S7, the processor-controller 9 multiplies the reference value (value obtained by adding the tolerance value to the base value) by a correction factor which will be described hereinlater, thereby setting a correction reference value. In this case, the base value is set every travel region and stored in the base value storing area $10_1$ in the memory 10. The tolerance value is inherently a constant value irrespective of the travel region and usually stored in the tolerance value storage area $10_2$ in the memory 10.

The correction factor is stored in the correction factor storage area $10_7$ in the memory 10 and updated each time the window moves to another travel region. Since the correction factor is always reset to "1" at the time point when the window stops moving, "1" is stored for a period of time from the start of movement of the window until the window travels to the next travel region.

In step S8, the processor-controller 9 compares the motor torque value detected in the travel region in which the window is travelling at present with the correction reference value set for the travel region.

In step S9, the processor-controller 9 determines whether the motor torque value is smaller than the correction reference value or not. When it is determined that the motor torque value is smaller than the correction reference value (Y), the routine advances to the next step S10. On the other hand, when it is determined that the motor torque value is not smaller than the addition value (N), the routine shifts to another step S23.

In step S10, in order to add all of motor torque values detected in the travel region in which the window is travelling, the processor-controller 9 adds the motor torque value to a torque data addition value in the torque data addition value storing area $10_3$ in the memory 10 and stores the resultant value.

In step S11, in order to count the number of motor torque detected in the travel region in which the window is travelling, the processor-controller 9 adds "1" to the number of torque data in the travel region stored in the storage area $10_5$ of the number of torque data within the travel region in the memory 10 and stores the obtained value.

In step S12, the processor-controller 9 counts the total number of all of the motor torque values obtained from the full-open position of the window to the travel region in which the window is travelling at present and stores the result of the counting into the storage area $10_6$ Of the total number of torque data in the memory 10.

In step S13, the processor-controller 9 determines the travel region in which the window is located at present on the basis of the total number of torque data stored in the storage area $10_6$ of the total number of torque data.

In step S14, the processor-controller 9 determines whether the present travel region of the window has changed to the next travel region or not on the basis of the determination of step S13. When it is determined that the travel region of the window has changed to the next travel region (Y), the routine advances to step S15. On the other hand, when it is determined that the travel region of the window has not been changed yet to the next travel region (N), the routine is returned to step S1 and the operations of step S1 and subsequent steps are repeatedly executed.

In step S15, the processor-controller 9 divides the addition motor torque value stored in the torque data addition value storage area $10_3$ in the memory 10 by the number of torque data in the travel region stored in the storage area $10_5$ of the number of torque data in a divided travel region, thereby obtaining the average motor torque value of the travel region in which the window is travelling at present.

In step S16, the processor-controller 9 calculates the ratio between the average motor torque value and the base value set for the travel region in which the window is travelling at present, thereby obtaining a rate of change in the base value in the travel region. The obtained rate of change is stored in the correction factor storage area $10_7$ in the memory 10.

In step S17, the processor-controller 9 determines if the obtained rate of change in the base value lies within 1±15%. When it is determined that the rate of change lies out of 1±15% (N), the routine advances to step S18. On the other hand, when it is determined that the rate of change is within 1±15% (Y), the routine advances to step S19.

In step S18, the processor-controller 9 stores the obtained rate of change as a correction factor into the correction factor storage area $10_7$.

In step S19, the processor-controller 9 stores "1" as a correction factor into the correction factor storage area $10_7$ in the memory 10. More specifically, when the rate of change exceeds 1±15%, the value of the rate of change is adopted as a correction factor and the reference value of the next travel region is corrected with the value. When the rate of change lies within 1±15%, "1" is set as a correction factor, that is, the reference value of the next travel region is not substantially corrected.

In step S20, the processor-controller 9 sets a new base value for the immediately preceding travel region on the basis of the motor torque value obtained in the immediately preceding travel region. As a new base value, the average value of the obtained motor torque values, that is, the value obtained in step S15 is applied.

In step S21, the processor-controller 9 updates the base value written in the base value storage area $10_1$ in the memory 10 to the base value newly set in step S20.

In step S22, the processor-controller 9 initializes the torque data addition value storage area $10_3$ and the storage area $10_5$ of the number of torque data in the divided travel region in the memory 10, which are used to obtain the average value of the motor torque values. After completion of the initialization, the routine is returned to the first step S1 and the operations of step S1 and subsequent steps are repeatedly executed.

The operations in the flowchart are repeated until: the driving of the motor 4 is stopped by the operation of the window raising switch $1_1$, the window lowering switch $1_2$, or the like to stop the travel of the window; the pinching of an object in the window is detected in step S23 which will be described hereinlater, so that the driving of the motor 4 is stopped to check the travel of the window; or the motor 4 is rotated in reverse and the direction of the travel of the window is changed to the other direction.

In step S23, the processor-controller 9 so operates as to prevent an object pinched in the window from being damaged in such a manner that the processor-controller 9 supplies the control signal to the motor control unit 3 and switches between the two relays $3_3$ and $3_4$ to stop the rotation of the motor 4, thereby stopping the travel of the window, or allows the motor 4 to rotate in reverse to change the direction of the travel of the window to the other direction.

At a time point when a predetermined time, for example, one hour, has elapsed after the stop of the driving of the motor 4, the correction factor of the correction factor storage area $10_7$ in the memory 10 is automatically changed to "1". The operation is performed to initialize the correction factor since the ambient temperature may fluctuate while the driving of the motor 4 is stopped and there is the possibility that the stored correction factor becomes an improper value.

Figure 6:
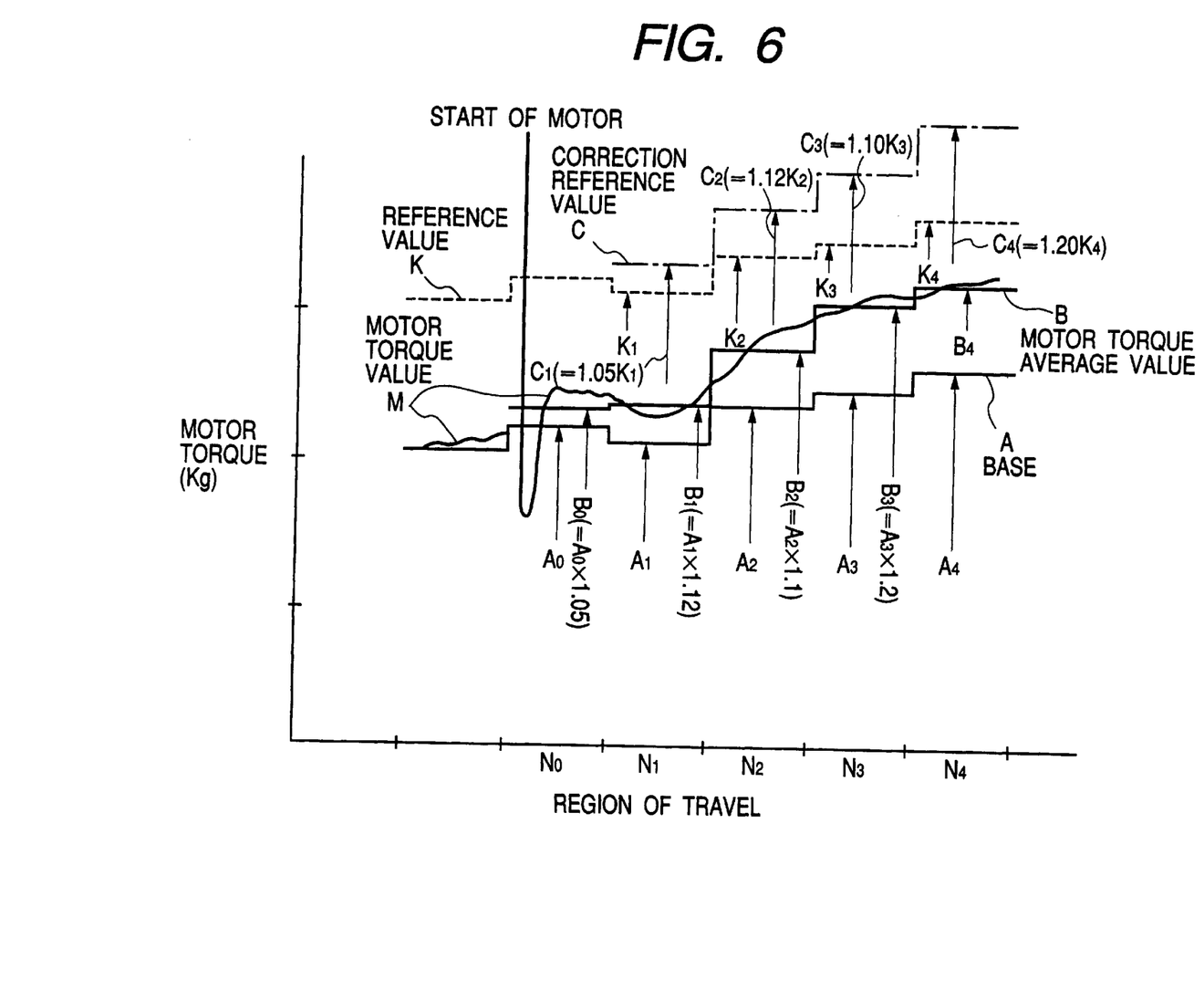
FIG. 6 is a characteristic diagram showing an example of the case where the addition value set for the travel region changes at the time of travel of the window in the power window apparatus shown in FIG. 1.

FIG. 6 is a characteristic diagram showing an example of a case where a reference value set for a travel region is corrected when the window travels in the power window apparatus illustrated in FIG. 1.

In FIG. 6, the vertical axis denotes the motor torque value and the lateral axis denotes the window travel region. The solid line (M) shows the motor torque value when the window travels from the travel region $N_0$ via travel regions $N_1$, $N_2$, and $N_3$ toward the travel region $N_4$. The step-like fine line (A) shows the base value set for each of the travel regions $N_0$ to $N_4$. The step-like bold solid line (B) indicates the average of the motor torque values of each of the travel regions $N_0$ to $N_4$. The step-like fine dotted line (K) shows the inherent reference value (base value+tolerance value) set for each of the travel regions $N_0$ to $N_4$. The step-like bold alternately long and short dash line (C) indicates the correction reference value which is newly set for each of the travel regions $N_1$ to $N_4$.

As shown in FIG. 6, in the case where the motor 4 is started when the window is in the travel region $N_0$ and the window travels sequentially from the travel region $N_0$ via the travel regions $N_1$, $N_2$, and $N_3$ toward the travel region $N_4$, the rate of change ($B_0/A_0$) between an average value $B_0$ of the motor torque values obtained in the first travel region $N_0$ and a base value $A_0$ set for the travel region $N_0$ is 1.05. The rate of change ($B_1/A_1$) between an average value $B_1$ of motor torque values obtained in the next travel region $N_1$ and a base value $A_1$ set for the travel region $N_1$ is 1.12. The rate of change ($B_2/A_2$) between an average value $B_2$ of motor torque values obtained in the next travel region $N_2$ and a base value $A_2$ set for the travel region $N_2$ is 1.10. When it is assumed that the rate of change ($B_3/A_3$) between an average value $B_3$ of motor torque values obtained in the next travel region $N_3$ and a base value $A_3$ set for the travel region N3 is 1.20, a reference value $K_1$ set for the travel region $N_1$ is multiplied by the rate of change 1.05 obtained in the travel region $N_0$, and a correction reference value $C_1$ becomes 1.05 $K_1$. Similarly, a correction reference value $C_2$ of the travel region $N_2$ becomes 1.12 $K_2$ (where, $K_2$ denotes a reference value set for the travel region $N_2$), a correction reference value $C_3$ of the travel region $N_3$ becomes 1.10 $K_3$ (where, $K_3$ denotes a reference value set for the travel region $N_3$). A correction reference value $C_4$ of the travel region $N_4$ becomes 1.20 $K_4$ (where, $K_4$ denotes a reference value set for the travel region $N_4$).

As described above, according to the method of detecting the pinching of an object in the power window apparatus in the embodiment, the pinching of an object in the window is detected in such a manner that when the motor torque value is detected in one window travel region, the ratio between the detected motor torque value and the base value set for the window travel region, that is, the rate of change is calculated and the correction factor is obtained. When the window travels into the next window travel region, the motor torque value detected in the next travel region is compared with the correction reference value obtained by multiplying the reference value set for the next travel region by the correction factor. Consequently, the correction reference value including the fluctuation in the motor torque value corresponding to the fluctuation in the ambient temperature of the vehicle which is being used is obtained without using the temperature sensor and the error at the time of detecting the pinching of an object in the window can be reduced.

In the foregoing embodiment, the correction is not performed when the rate of change is a small a, for example, <15% to fix the criterion of determination of the pinching of an object as much as possible. When priority is given to the coping with the fluctuation in the ambient temperature, however, such arrangement does not have to be used. In case of adopting the arrangement, the boundary of adopting the correction can be set to a value other than ±15%. The numerical value of ±15% is a value obtained from experience and can properly realize both the coping with the fluctuation in the ambient temperature and the fixing of the criterion of determination of the pinching.

Figure 7:
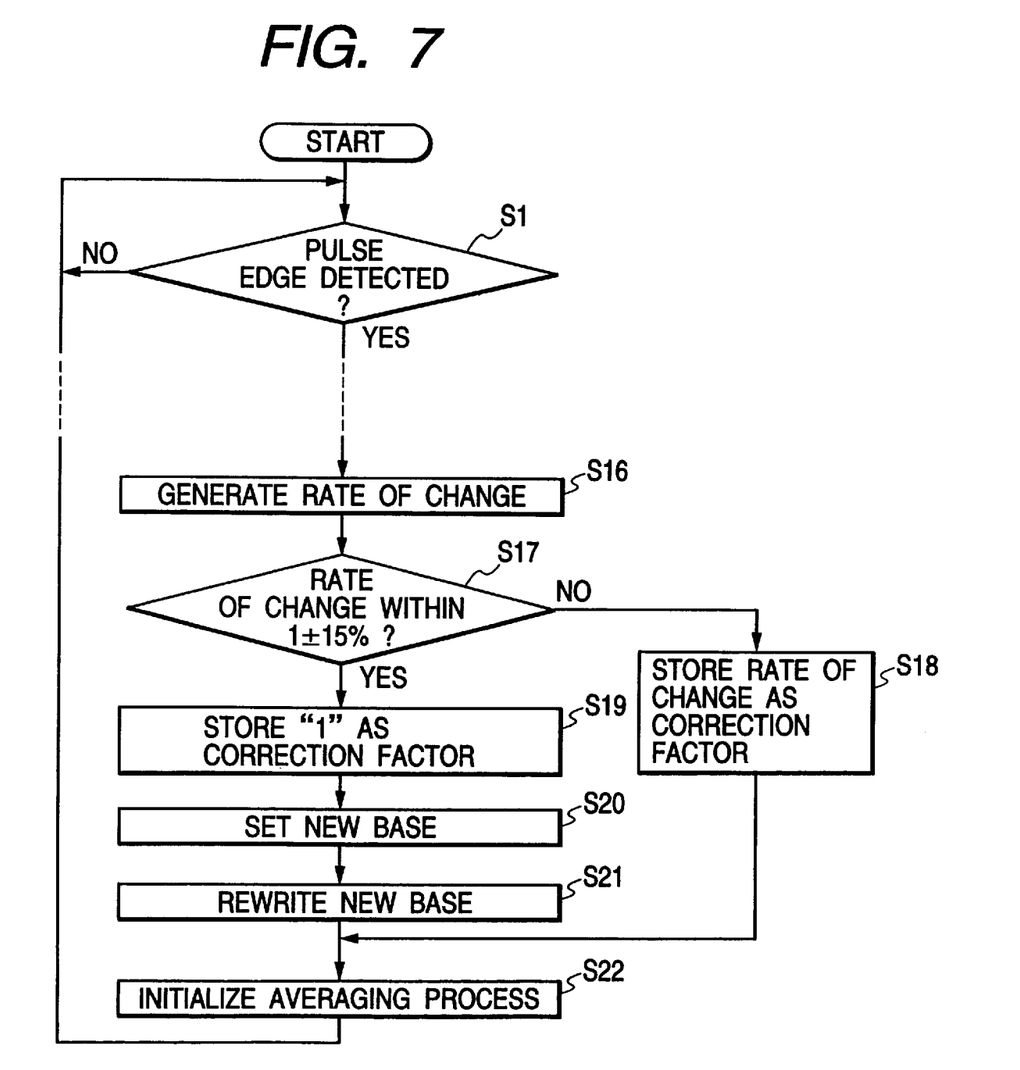
FIG. 7 is a flowchart showing the flow of further another operation when a correction reference tolerance value is obtained in the power window apparatus shown in FIG. 1.

FIG. 7 is a flowchart showing the process of further another operation for obtaining the correction reference tolerance value in the power window apparatus shown in FIG. 1, which is only a part of the process of the operation different from those of the flowcharts shown in FIGS. 4 and 5.

In FIG. 7, the same reference numerals are designated to the same processes as those shown in FIGS. 4 and 5.

The flowchart of FIG. 7 is different from those shown in FIGS. 4 and 5 with respect to the point such that when it is determined in step S17 that the rate of change is not within ±15% (N), after storing the rate of change as a correction factor in step S18, the base value is not newly set or updated in steps S20 and S21.

Since the operations of steps S1 to S23 other than that are the same as those which have been already described with reference to the flowcharts shown in FIGS. 4 and 5, the description is omitted here.

The embodiment relates to an example in which the base value is not updated when the rate of change is large. According to the construction, even when the operation in the environment where the rate of change is high, that is, the ambient temperature is extremely high or low is returned to the operation in the normal environment after an elapse of time, the base value is not concerned with an extreme change in environment, so that the pinching of an object can be properly determined even immediately after the start of operation.

Although the rate of change as a criterion used to determine whether the base value is updated or not is set to ±15% in the embodiment, the numerical value can be properly changed. Like the embodiment, by also using the criterion of the determination for correcting the reference value, the process can be simplified to some extent.

As described above, according to the invention, without using a temperature sensor, the correction factor includes fluctuation in the motor torque value corresponding to the fluctuation in the ambient temperature of the vehicle which is being used, and the correction reference value obtained by correcting the reference value by the correction factor including the fluctuation in the motor torque value is set. When the window travels in the window travel region thereafter, the motor torque value detected in the window travel region is compared with the corrected reference value, thereby enabling an error associated with the fluctuation in the ambient temperature to be reduced when the pinching of an object in the window at the time point the window travels in each window travel region is detected.

We claim:

1. An apparatus for detecting pinching of an object in a power window comprising:

a motor for opening and closing a window over a predetermined travel range via a window driving mechanism;

a motor driving unit for driving the motor;

a pulse generating unit for generating a pulse corresponding to the rotation of the motor;

a microcomputer control unit for performing a whole control driving process; and an operation switch for opening and closing the window by manual operation;

wherein the whole travel range of the window being equally divided into a plurality of travel regions, and a base value, a tolerance value, and a reference value which is a value obtained by adding the base value and the tolerance value being set for each travel region, and the microcomputer control unit for sequentially detecting motor torque values for opening and closing the window, comparing the detected motor torque value with the reference value which is preset for the travel region in which the window is positioned, determining the pinching of an object when the motor torque value exceeds the reference value, and stopping or reversely rotating the motor, wherein the microcomputer control unit calculates a correction factor as a ratio between the motor torque value detected in an arbitrary travel region and the base value set for the travel region and, in case of determining the presence or absence of the pinching of an object in the travel region next to the arbitrary travel region, the microcomputer control unit uses a corrected reference value obtained by multiplying the reference value by the correction factor in place of the reference value set for the next travel region.

2. The apparatus according to claim 1, wherein when the correction reference value is set only when the ratio between the motor torque value detected in each window travel region and the base value set for the window travel region is out of a predetermined range.

3. The apparatus according to claim 2, wherein the predetermined range of the ratio between the motor torque value and the base value is 0%±15%.

* * * * *